INVENTOR:
Pierre M. LUCAS
By Abraham A. Saffitz
ATTORNEY

INVENTOR:
Pierre M. LUCAS
By Abraham A. Saffitz
ATTORNEY

INVENTOR:
Pierre M. LUCAS
By Abraham A. Saffitz
ATTORNEY

Nov. 3, 1970

P. M. LUCAS 3,538,256

KEYBOARD SIGNALLING SYSTEM

Filed Dec. 2, 1968

4 Sheets-Sheet 4

INVENTOR:

Pierre M. LUCAS

By Abraham A. Saffitz

ATTORNEY

United States Patent Office 3,538,256

Patented Nov. 3, 1970

3,538,256

KEYBOARD SIGNALLING SYSTEM

Pierre M. Lucas, 20 Rue Tariel, Issy-les-Moulineaux, France

Filed Dec. 2, 1968, Ser. No. 780,536

Claims priority, application France, Dec. 8, 1967, 131,606

Int. Cl. H04m *11/06*

U.S. Cl. 179—2 3 Claims

ABSTRACT OF THE DISCLOSURE

A signalling system for a communication circuit, employing sequences of pulses chosen from a series of binary signals of positive and negative amplitude, and comprising a transmitter, including a keyboard with a plurality of keys arranged in rows and columns, each key of which when depressed causes the closing of a row switch, of a column switch and a common switch, an oscillator supplying alternating positive and negative pulses for controlling a chain of flip-flops arranged as frequency dividers, and a set of gates selectively transmitting the said positive and negative pulses to a transmision line through the aid common switch, under the control of the aid flip-flops and of the said row and column switches, the arrangement being such that a sequence of pulses consisting of an identification signal and a signal characteristic of the key depressed can be transmitted. The receiver comprises an oscillator having a frequency multiple of that of the above said oscillator, a plurality of flip-flops, a binary counter, a set of gates, a shift register, a detector of identification signals and devices for transmitting the said characteristic signals following on said identification signals to logical systems for controlling the connections effected through the said circuit.

The present invention relates to a keyboard signalling system for transmission of data in the form of a binary code, for example in telephone circuits, and particularly for subscribers telephone sets.

Two main types of signalling systems are known, which use a keyboard for the transmission of a small amount of numerical data between an operator or user and an equipment for data processing, for example an automatic telephone exchange, namely, a multifrequency system and a system employing line impedance variation. Depressing one of the keys of the board causes an action which is characteristic of the key depressed and can be detected at a distance. In the first system, a combination of frequencies is transmitted, whereas a variation in the line impedances measured by currents in either direction is transmitted in the second system. Both these systems have their limitations.

Costly equipment, like all the systems for generation and detection of actions of the analogical type, is required for the multifrequency system, for example, tuned oscillators in the subscriber's set and selective detectors employing tuned filters. This system hardly lends itself to miniaturisation.

The system employing impedance variation has a very restricted range and, owing to the fact that it entails the measurement of the variation of an imperfectly known quantity, the impedance of a telephone line, it is necessary as a rule to apply a complicated detection system including weighting with respect to the normal impedance. In this case too, the detection process is of the analogical type.

The invention has as its object to reduce these drawbacks of the known keyboard signalling systems.

The present invention consists in a signalling system for communication lines, employing sequences of pulses chosen from a series of binary signals of positive and negative amplitude, comprising a transmitter including a keyboard with a plurality of keys arranged in rows and columns each key of which when depressed causes the closing of a row switch, a column switch and/or a common switch, an oscillator supplying alternating positive and negative pulses for controlling a chain of flip-flops arranged as frequency dividers, and a set of gates selectively transmitting the said positive and negative pulses to the said transmission line through the said common switch, under the control of the said flip-flops and of the said row and column switches, the arrangement being such that a sequence of pulses consisting of an identification signal and a signal characteristic of the key depressed can be transmitted.

The invention further consists in a signalling system as set out in the preceding paragraph including a receiver comprising an oscillator whose frequency is a multiple of the rated frequency of the transmitter oscillator, a set of reception and storage flip-flops, a binary counter, a set of gates, a shift register, a detector of identification signals and devices for transmission of the said characteristic signals following the said identification signals to logical systems for controlling the connections effected by means of the said transmission line.

It is a feature of the said repetitive sequences of pulses, that each sequence begins with an unchanged series of pulses which represents a recognition or identification signal of the said sequence, whose detection thus becomes possible without ambiguity upon reception of a series of pulses distributed among a series of sequentially occurring binary or code elements, whose number is at least equal to that of a sequence, notwithstanding the relation existing between the instant of initial reception and the beginning of the sequence.

Another feature of the said repetitive sequences is that the application of pulses of either of two polarities does not induce an error of detection during the so-called permutation of the two wires of the telephone line between the keyboard and the detection element, owing to the fact that the pulse sequences co-ordinated with the different numerals are selected in such a manner that a reversal in polarity converts these into sequences which do not carry any particular meaning. If two identical detectors are connected in opposite directions to the wires of the line, one of them provides a correct identification and the other cannot detect any sequence of the code, and consequently fails to provide any response.

It is an advantage of the signalling system of the invention that the basic rhythm of the pulses, being established by an oscillator situated in the subscriber's instrument, is not characteristic of the signal and can vary within wide limits without hampering detection, with the result that the said oscillator need not to be tuned precisely, nor possess a high degree of stability of frequency.

The basic rhythm of the oscillator generating the pulses advantageously corresponds to a frequency within the band transmitted by the line, the range of the signalling system then being the same as that of the entire network.

The said signalling system is applicable not only to telephone circuits, but to any other transmission on the same circuits. In particular, it may be adapted for signalling purposes on data transmission lines.

Another advantage of the signalling system of the invention is that its principle based on digital coding makes it possible to generate and detect the signals solely by means of logical circuits appropriate for technical embodiment in the form of integrated circuits which are of low cost, easily miniaturised and highly reliable.

The invention will now be described by way of example with reference to the accompanying drawings, in which.

Figure 1:
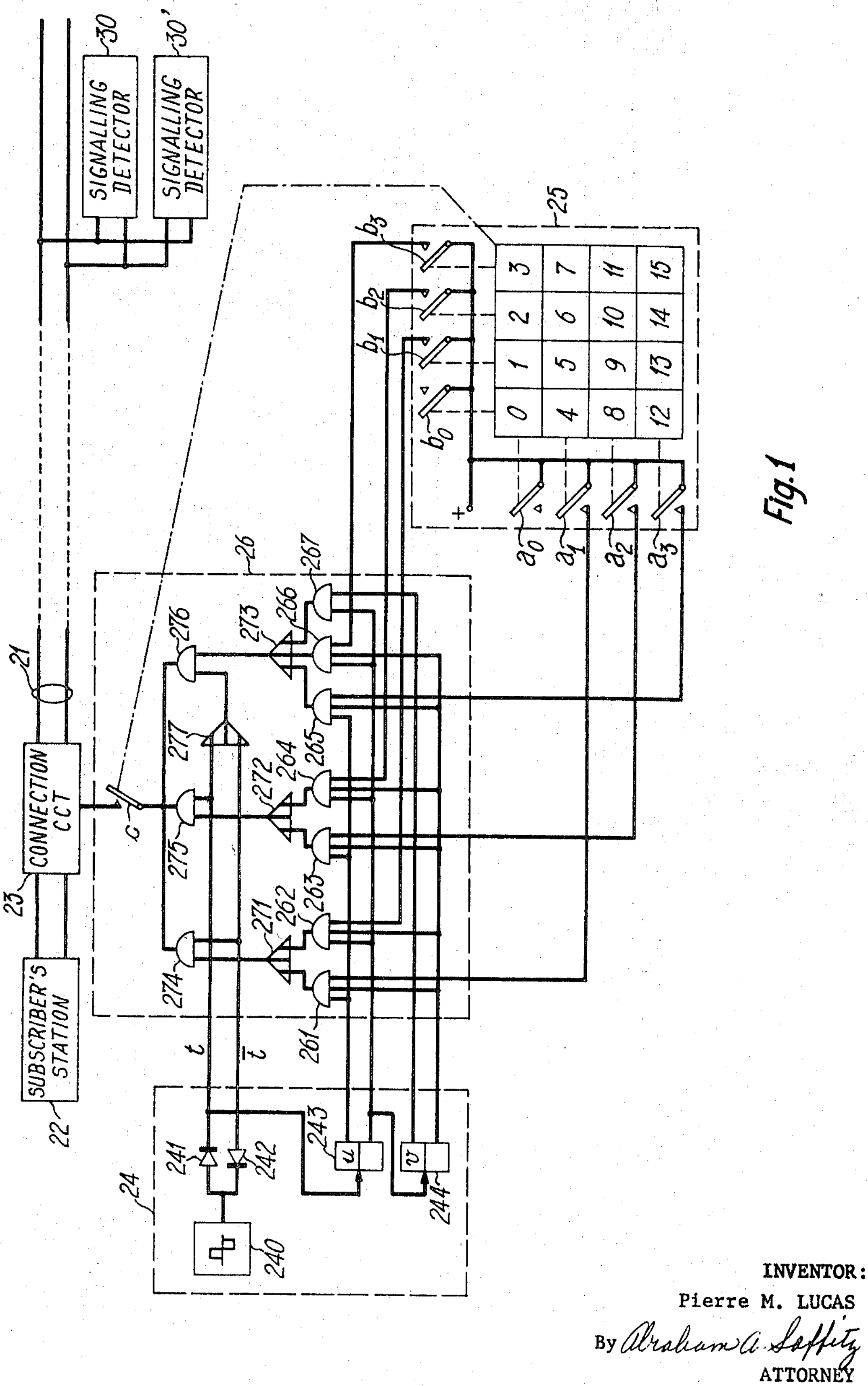
FIG. 1 illustrates the layout of a signal generator according to the invention, cooperating with a telephone line.

FIG. 1 shows a diagram of a keyboard signal generator, coordinated with a transmission line 21 which serves a subscriber's instrument 22 and to which it may be connected by means of a connection circuit 23. Two signal detectors 30 and 30', which are identical, are connected in opposite direction to the line 21 at its extremity terminating in an exchange to which it is connected.

The signal generator itself comprises a time base circuit 24, a keyboard 25 whereof each key controls a row switch, a column switch and an overall switch *c*, and a coder 26 for converting the signals fed to its input by the keyboard 25 into repetitive sequences of signals under control exercised by the time base 24. This latter comprises an oscillator 240 which supplies square-wave or sinusoidal signals alternately positive, referred to as *t* through a diode 241, and negative, referred to as $\bar{t}$ through a diode 242, and two bistable switching circuits or flip-flops 243, 244 arranged in scaling pattern which supply signals $u$, $\bar{u}$ and $v$, $\bar{v}$, respectively. The cycle of the time base 24 which is equal to a period of the flip-flop 244 thus encompasses eight alternations or four cycles of the oscillator 240 and thus establishes a sequence of eight elementary durations in which any pulse occupying a rank of odd order is positive and any pulse occupying a rank of even order is negative. The basic frequency of the oscillator may for example amount to 500 cycles per second.

The keyboard 25 comprises sixteen keys numbered from 0 to 15, arranged in four rows and four columns. Each row has co-ordinated with it a switch ($a_0$, $a_1$, $a_2$ or $a_3$) which is closed when any one of the four keys in said row is depressed. Switches $b_0$ to $b_3$ are similarly co-ordinated with the columns. A common switch *c* is closed when any one of the sixteen keys is depressed. A lay-out of this nature may be achieved either by allocating three individual switches for each key and by multiple linking of the switches by rows and by columns, or by means of a mechanism comprising a crossbar arrangement co-ordinated with the aggregate of the rows and columns, each bar actuating a particular contactor *a* or *b* and the common or shared contactor *c*.

The coder 26 comprises a set of seven input "AND" gates 261 to 267. The first six gates 261 to 266 possess three input terminals, of which one is connected to the output $\bar{v}$ of the flip-flop 244, and the seventh 267 has two input terminals of which one is connected to the output $v$ of the flip-flop 244 and the other to the output $\bar{u}$ of the flip-flop 243 equally connected to an input terminal of each of the gates 262, 264, 266. The output $u$ of the flip-flop 243 is connected to one input terminal of each of the gates 261, 263, 265. The third input terminals of the gates 261 to 266 are connected, correspondingly, to a source of potential, a positive one for example, by means of the contactors $a_1$, $b_1$, $a_2$, $b_2$, $a_3$, $b_3$. The output terminals of the gates 261 and 262 are connected by means of an "OR" gate 271 to an input terminal of an "AND" gate 274 whose second input terminal is connected to the output $\bar{t}$ of the oscillator 240, that is to say to the anode of the diode 242. The output terminals of the gates 263 and 264 are connected by means of an "OR" gate 272 to an input terminal of an "AND" gate 275 whose second input terminal is connected to the output *t* of the oscillator 240, that is to say to the cathode of the diode 241. The output terminals of the gates 265, 266 and 267 are connected by means of an "OR" gate 273 to an input terminal of an "AND" gate 276 whose second input terminal is connected to the output terminal of an "OR" gate 277 having two input terminals connected, correspondingly, to the output terminals *t* and $\bar{t}$ of the oscillator 240. The output terminals of the gates 274, 275 and 276 are connected to the transmission line 21 by means of the common contactor *c* of the keyboard 25 and by means of the connecting circuit 23.

Figure 2:
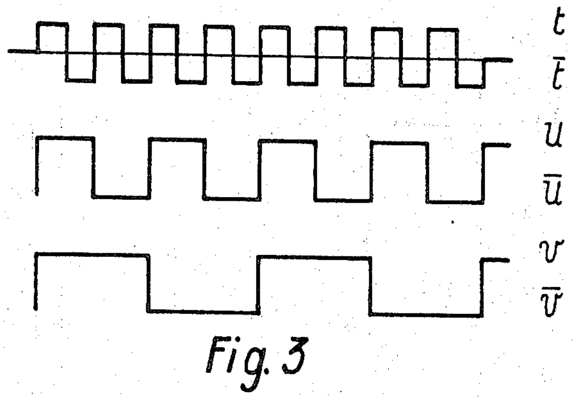
FIG. 2 shows an explanatory diagram of the operation of the signal generator of FIG. 1.
Figure 3:
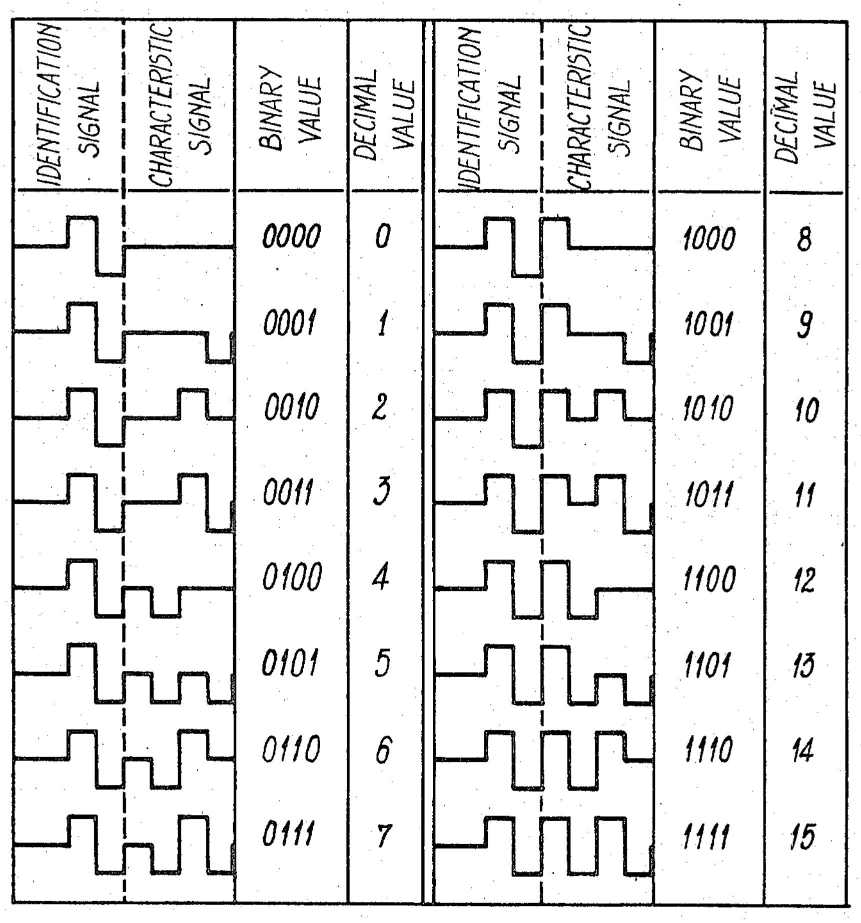
FIG. 3 shows a table of the coded combinations of the signal generator of FIG. 1.

FIG. 2 shows the phase relationship established between the oscillator 240 and the binary demultipliers 243, 244, that its to say between the signals $t$, $\bar{t}$, $u$, $\bar{u}$, and $v$, $\bar{v}$, and FIG. 3 shows the sequences transmitted by the coder 26 for each cycle of the time base throughout the time one of the keys 0 to 15 of the keyboard 25 is depressed.

The first half of each cycle comprising four elementary durations and defined from the time base 24, which is characterized by the signal $v$ of the flip-flop 244, is reserved for a recognition or identification signal. The first two of the said durations do not comprise any output pulse owing to the fact that the gate 267, which is the only gate of gates 261–267 able to be open throughout the duration of the signal $v$, remains closed during the supply of signal $u$. The third and fourth elementary durations respectively, provide an output comprising the positive pulse $t$ and the negative pulse $\bar{t}$ supplied by the oscillator 240 to the gate 276 which is opened by the output signal of the opened gate 267 receiving the signals $v$ and $\bar{u}$.

The output from coder 26 in the second half of each cycle of the time base 24, during which the flip-flop 244 supplies the signal $\bar{v}$, is characteristic of the key depressed. During the first two elementary durations of the characteristics signal, during which the flip-flop 243 supplies the signal $u$ to the gates 261, 263 and 265, only one of these can be opened depending on whether the key depressed causes the closing of the row switches $a_1$, $a_2$ or $a_3$, but all three remain closed if the key depressed forms part of the first row, since the contactor $a_0$ is not in use and there is therefore no pulse. If the gate 261 is opened, there is no output pulse during the first of the elementary durations and the gate 274 supplies the negative pulse $\bar{t}$ during the second of them. When the gate 263 is opened, the gate 275 supplies a positive pulse $\bar{t}$ during the first elementary duration but no pulse during the second, and if the gate 265 is unblocked, the gate 276 supplies a positive pulse $t$ and then a negative pulse $\bar{t}$. The third and fourth elementary durations in the characteristic signal similarly serve the purpose of denoting the column of the key depressed, by keeping all gates closed in respect of th· first column and by unblocking the gates 262, 264 and 266 corresponding to the second, third and fourth columns, respectively.

The signal generator not being connected to the connection circuit 23 except whilst a key is being depressed, by means of the common contactor *c*, the connection may be made by feed in series or in parallel to the transmission line 21 with or without elimination of the elements of the subscriber's instrument 22.

Figure 4:
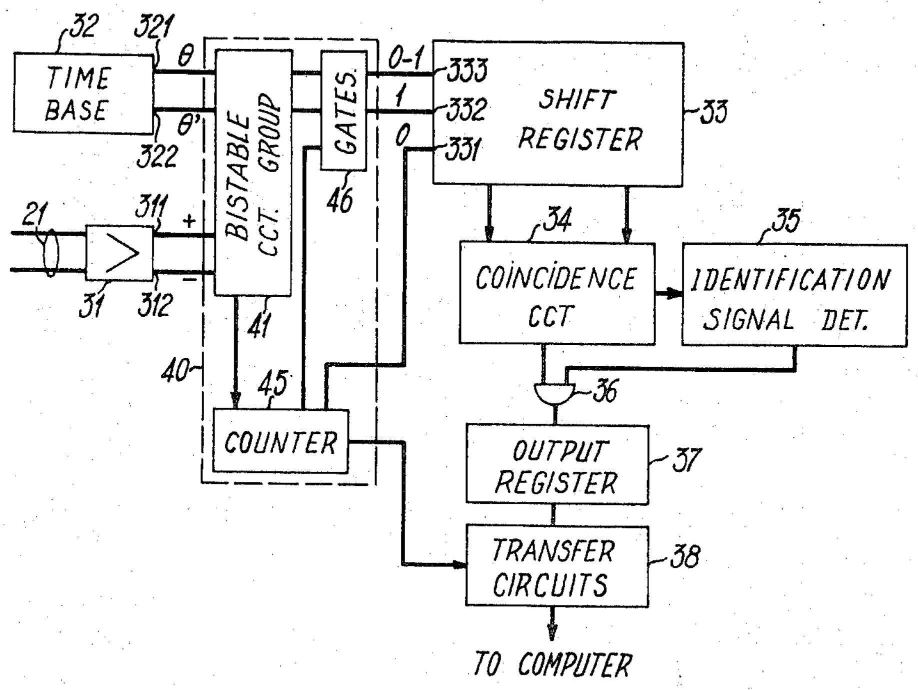
FIG. 4 shows a fundamental block diagram of a detector according to the invention, for the signals coming from the generator of FIG. 1.

FIG. 4 shows a block diagram of a simple embodiment of one of the two identical signal detectors 30 and 30' connected in opposite directions to the line 21 in FIG. 1. This embodiment corresponds to the case in which the basic frequency of the signals received, that is to say the frequency of the oscillator 240, is considered as being known and as adhering to its nominal rating within a tolerance not exceeding plus or minus 15 percent.

Figure 5:
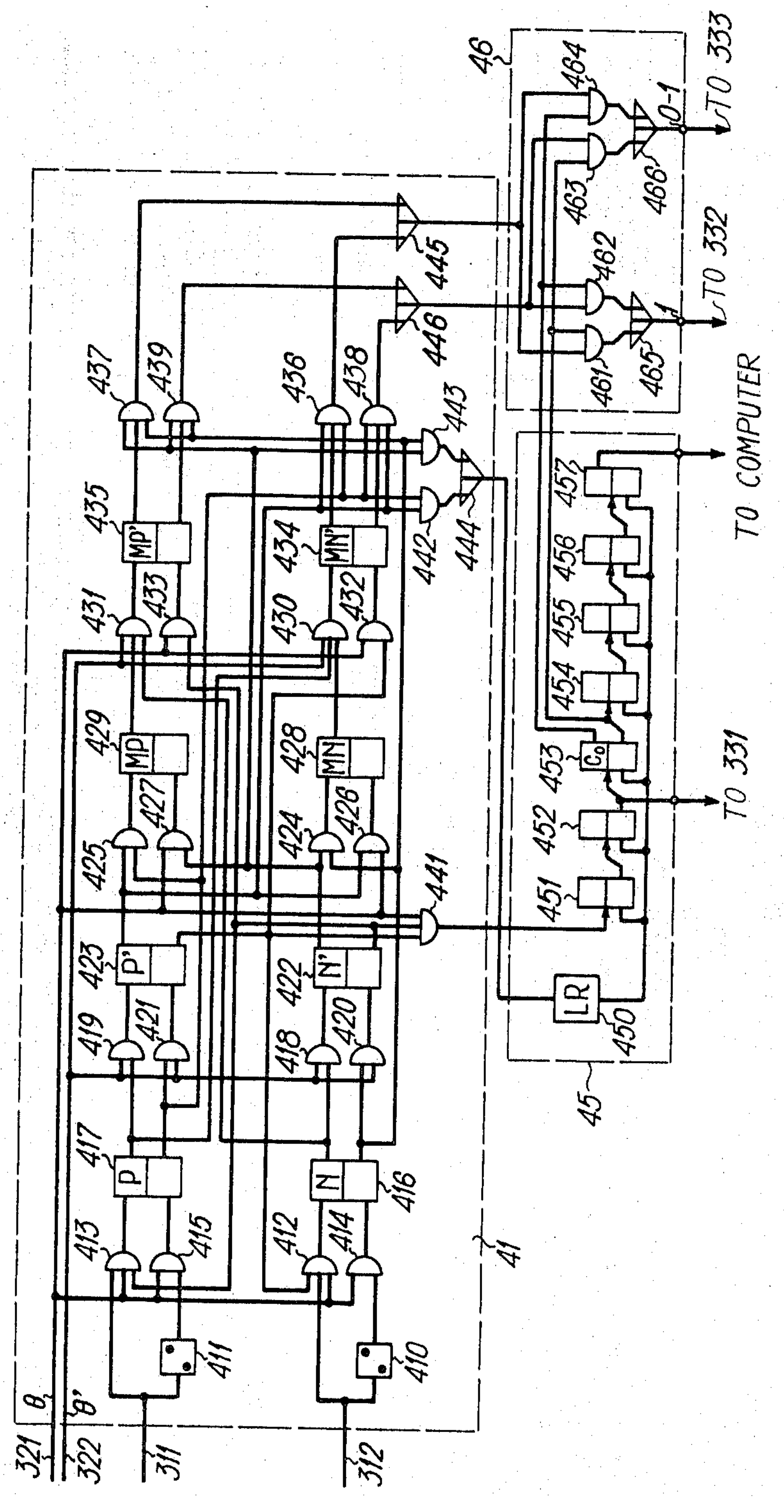
FIG. 5 is a logical diagram of a sub-assembly of FIG. 4.

This signal detector comprises a reception amplifier 31 connected to the transmission line 21, a time base 32, a subassembly 40 illustrated in greater detail in FIG. 5, a shift register 33 possessing sixteen binary elements which is coordinated with two circuits 34 and 35 for detection of the identification signal, a set of gates 36 for transfer of the characteristic signal identified into an output register 37, and a circuit 38 for transfer of the contents of the output register 37 to the logical elements for control of the automatic exchange to which the line 21 is connected.

The corresponding positive and negative signals from the signal generator appear at the two output terminals 311 and 312 of the reception amplifier 31. The time base 32 comprises two output terminals 321, 322 by means of which it supplies alternate pulses $\theta$ and $\theta'$, whose period amounts to 0.25 millisecond for example, that is to say one-quarter of the nominal duration of the pulses transmitted by the keyboard.

The sub-assembly 40 comprises a set of reception and store flip-flops 41 (FIG. 5) which record on the one hand the beginning and end of the positive signals and of the negative signals on the other hand, and which preserve the memory of the polarity of the preceding pulse until the end of the pulse transmission in progress. Sub-assembly 40 also comprises a counter 45, whose progression input terminal receives the pulses $\theta$ transmitted by the set of flip-flops 41, which pulses flow during the intervals between characteristic signal pulses to indicate the number of characteristic elementary signals having the value zero corresponding to each of these intervals. As apparent from FIG. 3, the normal sequences of signals may comprise from one to six consecutive zeros. An interval of more than 8 milliseconds thus characterizes the end of a numeral and a counter 45 then opens the transfer circuits 38. The set of flip-flops 41 and the counter 45 transmit the progression commands derived from the detected signal to the shift register 33 by means of a set of gates 46. These commands may be such as to arrange for the infeed of a binary element equal to zero, or of a binary element equal to one, or of the binary element zero followed by the binary element one, to the input terminal of the register 33.

The shift register 33 has sixteen stages so that it may record two consecutive sequences of eight binary elements of which each represents a combination of the code. The circuit 34 has the function of detecting the coincidence of two groups of four homologous binary elements in the two halves of the register. The circuit 35 has the function of verifying the identification signal 0 0 1 1 which, if verified, has thus been received correctly twice, and of causing the transfer by means of the set of gates 36 of the four binary elements coming from the coincidence circuit 34 which follow the binary elements of the identification signal.

FIG. 5 is a logical diagram of the sub-assembly 40 of FIG. 4. The set of flip-flops 41 comprises two similar chains allocated, respectively, to the signals of positive polarity appearing at the output connection 311 of the amplifier 31 and to the signals of negative polarity transmitted through the connection 312.

The connection 311 is connected, via an "AND" gate 413 having three input terminals, to the actuating input terminal of a flip-flop 417. Connection 311 is also connected, via an inverter 411 and an "AND" gate 415 having two input terminals, to the "return to rest" input terminal of the same flip-flop 417. The operative and idle state output terminals of the flip-flop are connected, respectively, by means of "AND" gates 419, 421, each possessing two input terminals, to the actuating and "return to rest" input terminals of a flip-flop 423.

Analogously, the connection 312 is connected, via an "AND" gate 412 possessing three input terminals, to the actuating terminal of a flip-flop 416, and via an inverter 410 and of an "AND" gate 414 possessing two input terminals, to the "return to rest" input terminal of the same flip-flop 416. The output terminals of the latter are connected to the equivalent input terminals of a flip-flop 422 by means of "AND" gates 418, 420, each possessing two input terminals.

Each of the gates 413, 415, 412, 414 has an input terminal connected to the output terminal 321 of the time base 32. The third input terminal of the gate 413 is connected to the rest condition output terminal of the flip-flop 422 and the third input terminal of the gate 412 is connected to the rest condition output terminal of the flip-flop 423. The second input terminals of the gates 419, 421, 418, 420 are connected to the output terminal 322 of the time base 32.

If the work and rest states of the flip-flop 417 are referred to as P and $\overline{P}$, with P′ and $\overline{P}'$ denoting the identical states of the flip-flop 423 and analogously N, $\overline{N}$ and N′, $\overline{N}'$ denoting the 1 and 0 conditions of the flip-flops 416 and 422, and if $p$ and $\overline{p}$ are employed to denote the presence and the absence of a positive signal at the connection 311, and $n$ and $\overline{n}$ to denote the presence and the absence of a negative signal at the connection 312, the logical work and rest conditions of the flip-flops 417, 416, 423 and 422 are, respectively:

| Flip-flop | To state 1 | To state 0 |
|---|---|---|
| 417 | $p.\overline{N}.\theta$ | $\overline{p}.\theta$ |
| 416 | $n.\overline{p'}.\theta$ | $\overline{n}.\theta$ |
| 423 | $P.\theta'$ | $\overline{P}.\theta'$ |
| 422 | $N.\theta'$ | $\overline{N}.\theta'$ |

The rest condition output terminals of the flip-flops 423, 422 and the output terminal 321 of the time base 32 are connected, respectively, to the three input terminals of an "AND" gate 441 whose output terminal is connected to the input terminal for progression of the counter 45.

The condition for application of counting pulses at the input terminal of the counter 45 is thus represented by $$\overline{P}'.\overline{N}'.\theta$$

The rest condition output terminal of the flip-flop 417 and the work condition output terminal of the flip-flop 423 are connected to the two input terminals of an "AND" gate 442. The rest condition output terminal of the flip-flop 416 and the work condition output terminal of the flop-flop 422 are connected to the two input terminals of an "AND" gate 443. The output terminals of the gates 442, 443 are connected by means of an "OR" gate 444 to the input terminal effecting the zero-resetting of the counter 45, the input connection to which comprises a delay circuit 450.

The condition for the resetting to zero of the counter 45 is thus represented by:

$$\overline{P}.P'+\overline{N}.N'$$

with a time lag.

The work condition output terminal of the flip-flop 423 is connected, on the one hand, to the working input terminal of the flip-flop 429 by means of an "AND" gate 425 whose second input terminal is connected to the rest condition output terminal of the flip-flop 417, and on the other hand to the "return to rest" input terminal of the flip-flop 428 by means of an "AND" gate 426 whose second input terminal is connected to the output terminal 321 of the time base 32.

Symmetrically, the work condition output terminal of the flip-flop 422 is connected, on the one hand, to the working input terminal of the flip-flop 428 by means of an "AND" gate 424 whose second input terminal is connected to the rest condition output terminal of the flip-flop 416, and on the other hand to the "return to rest" input terminal of the flip-flop 429 by means of an "AND" gate 427 whose second input terminal is connected to the output terminal 321 of the time base 32.

The working condition output terminal of the flip-flop 429 is connected to the working input terminal of a flip-flop 435 by means of an "AND" gate 431 possessing three input terminals, whose second and third input terminals are connected, respectively, to the working condition output terminal of the flip-flop 416 and to the output terminal 322 of the time base 32. The "return to rest" input terminal of the flip-flop 435 is connected to the output terminal of an "AND" gate 433 whose first input terminal is connected to the rest condition output terminal of the flip-flop 422, while its second input terminal is connected to the terminal 321.

Symmetrically, the working condition output terminal of the flip-flop 428 is connected to the working input terminal of a flip-flop 434 through an "AND" gate 430 possessing two other input terminals connected, respectively, to the working condition output terminal of the flip-flop 417 and to the terminal 322. The "return to rest" input terminal of the flip-flop 434 is controlled by means of an "AND" gate 432 having its first input terminal connected to the rest condition output terminal of the flip-flop 423 and its second input terminal connected to the terminal 321.

The working condition output terminal of the flip-flop 435 is connected to an "OR" gate 445 via an "AND" gate 437 possessing two other input terminals connected, respectively, to the rest condition output terminal of the flip-flop 416 and to the working condition output terminal of the flip-flop 422. The second input terminal of the gate 445 is connected to the output terminal of an "AND" gate 436 possessing three input terminals, connected respectively to the working condition output terminal of the flip-flop 434, to the rest condition output terminal of the flip-flop 417 and to the working condition output terminal of the flip-flop 423.

The rest condition output terminal of the flip-flop 435 is connected to an input terminal of an "OR" gate 446 through an "AND" gate 439 having two input terminals connected, respectively, to the rest condition output terminal of the flip-flop 416 and to the working condition output terminal of the flip-flop 422. The second input terminal of the gate 446 is connected to the output terminal of an "AND" gate 438 possessing three input terminals connected, respectively, to the rest condition output terminals of the flip-flops 434 and 417 and to the working condition output terminal of the flip-flop 423.

If MP and $\overline{MP}$ are employed to denote the work and rest conditions of the flip-flop 429, MP′ and $\overline{MP'}$ to denote the same states of the flip-flop 435 and analogously MN, $\overline{MN}$ and MN′, $\overline{MN'}$ to denote the states 1 and 0 of the flip-flops 428 and 434, the logical conditions for the passing to work and return to rest of the flip-flops 429, 428, 435 and 434, are the following:

| Flip-flop | To state 1 | To state 0 |
|---|---|---|
| 429 | $\overline{P}.P'$ | $N'.\theta$ |
| 428 | $\overline{N}.N'$ | $P'.\theta$ |
| 435 | $MP.N.\theta'$ | $\overline{N}'.\theta$ |
| 434 | $MN.P.\theta'$ | $\overline{P}'.\theta$ |

It will be evident that when a pulse, for example a positive pulse, is transmitted over the line and appears at the connection 311, the flip-flop P 417 passes to its working condition during the first and second pulse θ depending on whether the last negative input pulse terminated before or after the preceding pulse θ′, and that the flip-flop P′ 423 passes to its working condition by means of the following pulse θ′. The flip-flop MP 429 is not actuated until the instant θ following the termination of the positive pulse, at which instant the flip-flop P 417 is caused to return to rest, the flip-flop P′ 423 itself being returned to rest at the following instant θ′. The working condition of the flip-flop MP 429 is not transferred to the flip-flop MP′ 435 until the flip-flop N 416 is actuated, the flip-flop M 429 being returned to rest by the very next instant θ, and the flip-flop MP′ 435 itself being returned to rest at the instant θ′ which follows the termination of the negative signal which had caused its passing to the work condition. Consequently, during the duration of a negative pulse and until the next instance θ′, the work condition of the flip-flop MP′ 435 denotes that the preceding pulse was positive, and analogously, during the duration of a positive pulse, the work condition of the flip-flop MN′ 434 denotes that the preceding pulse was negative. The "OR" gate 445 which connects the output terminals of the gates 437 and 436 thus supplies a signal during the period of time in which these gates are open, that is to say between the instants θ and θ′ immediately following the termination of an input pulse, if the latter is of opposite polarity to its preceding one. The gates 439, 438 serving the rest condition output terminals of the flip-flops MP′ 435 and MN′ 434 and consequently the "OR" gate 446 which connects their output terminals, supply a signal when the pulse in process of termination is of the same polarity as the preceding one.

The logical conditions in which the gate 445 supplies a signal denoting a change in polarity may be expressed as:

$$\overline{P}.P'.MN'+\overline{N}.N'.MP'$$

and in the contrary case, for the gate 446:

$$\overline{P}.P'.\overline{MN'}+\overline{N}.N'.\overline{MP'}$$

The counter 45 comprises a sufficient number of flip-flops to count at least the number of pulses θ chosen as characteristic of the termination of a numeral. The pulses θ of a duration of 0.25 millisecond for example, and a duration exceeding 8 milliseconds being taken as characteristic of the termination of a numeral, the counter 45 may comprise seven flip-flops 451 to 456 of which the first is controlled by the pulses θ fed to the same by the gate 441 in the interval between pulses, and a further one 457 which feeds a numeral termination signal to the logical control elements of the automatic exchange from its output terminal, when the counter has counted off 64 pulses θ or 16 milliseconds. The rest condition output terminal of the flip-flop 452 which supplies a signal every four pulses θ, that is to say at the end of each millisecond during which no pulse had appeared at the connection 311 or at the connection 312, is connected to an input terminal 331 actuating the recording of a zero in the shift register 33.

The output terminals of the flip-flop 453 which switches over at the cadence of one millisecond, are connected, as well as the output terminals of the gates 445 and 446, to input terminals 332 and 333 of the register 33 through the set of gates 46. The latter comprises four "AND" gates 461, 462, 463 and 464, and two "OR" gates 465 and 466.

The work and rest condition output terminals of the flip-flop 453 are connected, respectively, the first to an input terminal of each of the gates 462 and 464, the second to an input terminal of each of the gates 461 and 463. The output terminal of the gate 445 is connected to the second input terminals of the gates 461 and 464. The output terminal of the gate 446 is connected to the second input terminals of the gates 462 and 463. The output terminals of the gates 461 and 462 are connected through an "OR" gate 465 to the input terminal 332 for actuation of the recording of an 1 in the shift register 33. The output terminals of the gates 463 anr 464 are connected through an "OR" gate 466 to the input terminal 333 for actuation of the recording of the numerals 0 and 1, in this order, in the shift register 33.

The output terminal of the gate 444 for actuation of the so-called "reset" of the counter 45 is connected through a delay circuit 450 to the return to rest input terminals of all the flip-flops 451 to 457.

If $C_0$ and $\overline{C}_0$ are employed to denote the work and rest conditions of the flip-flop 453, the logical conditions for the opening of the gates 461 to 646, are— gate 461: $(\overline{P}\cdot P'\cdot MN'+\overline{N}\cdot N'\cdot MP')\overline{C}_0$
gate 462: $(\overline{P}\cdot P'\cdot \overline{MN'}+\overline{N}\cdot N'\cdot \overline{MP'})C_0$
gate 463: $(\overline{P}\cdot P'\cdot \overline{MN'}+\overline{N}\cdot N'\cdot \overline{MP'})\overline{C}_0$
gate 464: $(\overline{P}\cdot P'\cdot MN'+\overline{N}\cdot N'\cdot MP')C_0$ from which it is apparent that the gate 465 supplies a signal causing the feed of the numeral 1 into the shift register 33 if the pulse in process of termination is of opposite polarity to the preceding one and the flip-flop 453 is in its rest condition, or if the pulse in process of termination has the same polarity as the preceding one whilst the flip-flop 453 is in its working condition. Since the state of the flip-flop 453 has not changed from the beginning of the pulse which had blocked the counter progression pulses, this state denotes the fact that an even or odd number of milliseconds has been counted by the counter 45 since the preceding pulse and for each of which a signal had been fed by the flip-flop 452 to the input terminal 331 for entry of a zero in the shift register 33. If this number of milliseconds is zero or an even number, the flip-flop 453 is in its rest condition and the alternation in the polarity of the pulses of the code of FIG. 3 implies that the pulse in process of termination is of the opposite polarity to the preceding one. As a result, the gate 461 transmits a command for the entry of the numeral 1 to the input terminal 332 of the shift register. If this number is odd, the flip-flop 453 is in its work condition, and if the gate 446 supplies a signal denoting that the polarity of the pulse is the same as that of the preceding one, the gate 462 transmits the signal for entry of the numeral 1.

The gate 466 supplies a signal causing the entry in the register 33 of the numeral zero followed by the numeral 1 at the end of a pulse whose polarity does not, according to the state of the flip-flop 453, correspond to the principle of the alternation of the code, which shows that the pulse has been received prior to its nominal instant of appearance and has blocked the counter before it had performed the entry of the zero which normally indicates the termination of a millisecond duration not occupied by a pulse. This arrangement renders it possible to feed into the shift register the number of zeros's which actually correspond to the binary elements transmitted, despite considerable fluctuations of the oscillators associated with the keyboards of the subscribers' instruments, relative to their nominal frequency.

Figure 6:
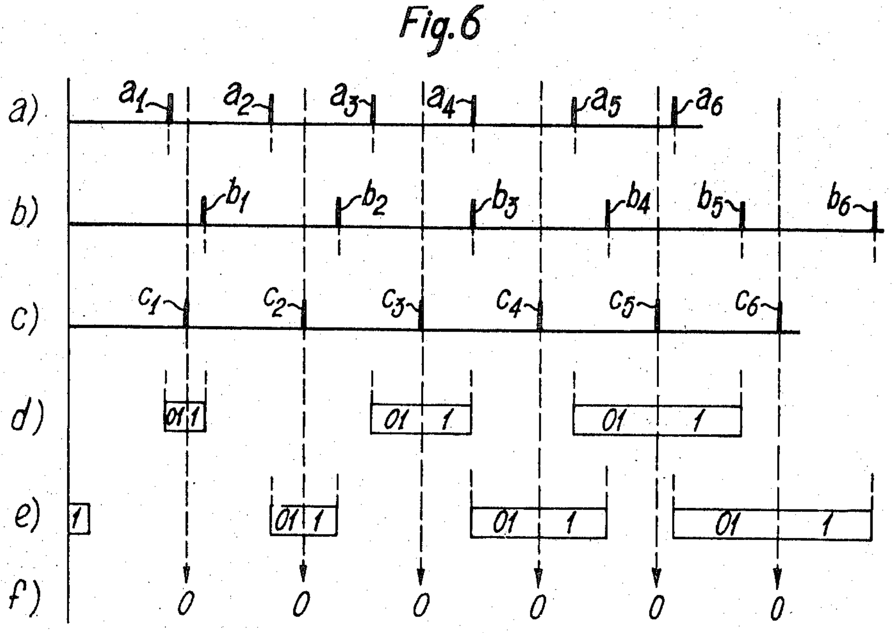
FIG. 6 is an explanatory diagram of the operation of the signal detector of FIG. 4.

FIG. 6 demonstrates that up to six consecutive zero's may thus be detected without ambiguity with a tolerance of plus or minus 15 percent for variations in transmission speed, without any adjustment of the detecting time base 32 (FIG. 4).

In FIG. 6, the line a represents six significant instants $a_1$ to $a_6$ of a signal supplied by an oscillator 240 (FIG. 1) whose frequency exceeds the rated frequency by 15%, the line *b* representing six instants $b_1$ to $b_6$ of a signal whose frequency is lower than 15% than the rated frequency, the line *c* representing the counting of the milliseconds by the counter 45 operating at the nominal speed, the line *d* showing the intervals during which may occur the beginnings of pulses of the same polarity as the last pulse registered, the line *e* shows the intervals in which may occur the beginnings of pulses of the opposite polarity to that of the last pulse registered. In the two lines *d* and *e* the intervals in question straddle the line marking the nominal signal appearance instant as established by the counter 45. It has been shown in FIG. 6 that in the left-hand portion of each interval corresponding to the case in which the pulse is received prior to the nominal instant, the signal for entry of the numeral 0 followed by the numeral 1 is fed to the input terminal 333 of the shift register 33, whereas the right-hand part of the interval, corresponding to the case in which the pulse is received with a delay, the signal for entry of the numeral 1 only is fed to the input terminal 332 of the shift register 33, the line *f* showing the instants at which the progression of the counter 45 causes orders for entry of a zero to be fed to the input terminal 331 of the shift register 33.

What I claim is:

1. A signalling system for a transmission line, employing sequences of pulses chosen from a series of binary signals of either a positive and a negative amplitude, comprising a transmitter including a keyboard with a plurality of keys arranged in rows and columns each key of which when depressed causes the closing of a row switch, of a column switch and of a common switch, an oscillator supplying alternating positive and negative pulses for controlling a chain of flip-flops arranged as frequency dividers, and a set of gates selectively transmitting said positive and negative pulses to said transmission line through said common switch under the control of said flip-flops and of said row and column switches, the arrangement being such that a sequence of pulses consisting of an identification signal and a signal characteristic of the key depressed is transmitted to said line.

2. A signaling system as claimed in claim 1, including a receiver comprising means for receiving said pulse sequences, a time base controlled by a further oscillator whose nominal frequency is a multiple of the rate frequency of said transmitter oscillator, a set of reception and storage flip-flops, controlled by said receiving means and time base, a binary counter controlled by said flip-flops, a set of gates, a shift register, a detector of identification signals and devices for transmission of said characteristic signals following said identification signals to logical systems for controlling the connections assured by means of said transmission line.

3. A signalling system as claimed in claim 2, in which said set of flip-flops transmits to said counter progression signals coming from said further oscillator within the intervals between said received pulses, and also transmits to said set of gates signals which at the end of each pulse received indicate whether the latter pulse is of opposite or identical polarity to that of the preceding pulse, said counter effecting the entry of a zero into said shift register for each change of the state of one of its stages occurring with a periodicity equal to the nominal periodicity of said transmitter oscillator and feeding to said set of gates signals denoting the state of said one of said stages, so that said set of gates, at the end of each pulse received, causes the entry into said shift register of the numeral 1 if the polarity relationship between said pulse and the preceding one and the parity of the number of nominal semiperiods of said transmitter oscillator counted by said counter comply with a preassigned alternation coding principle, the entry of the numeral 1 preceded by the numeral 0 being caused in the contrary case, whereby substantial fluctuations in the frequency of the transmitter oscillator relative to its nominal frequency do not introduce an error in the signals registered in said shift register.

References Cited

UNITED STATES PATENTS 2,463,717 3/1949 Riebe.
2,957,952 10/1960 Jaeger.

FOREIGN PATENTS 850,631 10/1960 Great Britain.

RALPH D. BLAKESLEE, Primary Examiner

U.S. Cl. X.R.

179—90; 340—365; 178—17